US008965678B2

(12) United States Patent  
Herrmann

(10) Patent No.: US 8,965,678 B2
(45) Date of Patent: Feb. 24, 2015

(54) PARKING ASSIST SYSTEM

(71) Applicant: GM Global Technology Operations LLC, Detroit, MI (US)

(72) Inventor: Hartmut Herrmann, Floersheim (DE)

(73) Assignee: GM Global Technology Operations LLC, Detroit, MI (US)

(*) Notice: Subject to any disclaimer, the term of this patent is extended or adjusted under 35 U.S.C. 154(b) by 40 days.

(21) Appl. No.: 13/715,837

(22) Filed: Dec. 14, 2012

(65) Prior Publication Data

US 2013/0158851 A1    Jun. 20, 2013

(30) Foreign Application Priority Data

Dec. 15, 2011  (DE) .................. 10 2011 121 285

(51) Int. Cl.
*B60Q 1/48* (2006.01)
*G02B 27/01* (2006.01)
(Continued)

(52) U.S. Cl.
CPC ............... *G06F 17/00* (2013.01); *G08G 1/168* (2013.01); *B60T 2201/10* (2013.01); *B60R 2300/8093* (2013.01); *B60R 2300/806* (2013.01); *B62D 15/027* (2013.01); *B60Q 1/268* (2013.01);
(Continued)

(58) Field of Classification Search
CPC ...... G06F 17/00; B62D 15/027; B60Q 9/007; B60Q 9/006; B60Q 1/268; B60Q 9/008; G08G 1/168; B60R 2300/806; B60R 2300/8093; G02B 27/01

USPC ............... 701/300, 301; 340/901, 904, 932.2, 340/988, 435, 436, 815.45, 384.1; 345/7
See application file for complete search history.

(56) References Cited

U.S. PATENT DOCUMENTS 4,737,001 A * 4/1988 Moss .............................. 359/34
6,184,800 B1 * 2/2001 Lewis ........................ 340/932.2
(Continued)

FOREIGN PATENT DOCUMENTS

DE      4135042 C1     2/1993
DE      19708610 A1    9/1998
(Continued)

OTHER PUBLICATIONS

Guanglin et al, A Real-Time Rear View Camera Based Obstacle Detection, 12th International IEEE Conference on Intelligent Transportation Systems, 2009, pp. 1-6.*
(Continued)

*Primary Examiner* — Russell Frejd
(74) *Attorney, Agent, or Firm* — Ingrassia Fisher & Lorenz, P.C.

(57) ABSTRACT

A device for assisting the driver of a vehicle in the process of parking is provided. The device includes sensors for detecting obstacles in an environment of the vehicle, at least in an environment in front and in back of the vehicle, and a display for indicating the distance between the vehicle and an obstacle identified in the environment. The display includes a first means, with which the distance between the vehicle and an obstacle identified in front of the vehicle can be displayed on a windshield of the vehicle, and a second means, with which the distance between the vehicle and an obstacle identified in back of the vehicle can be displayed on a rear window of the vehicle.

11 Claims, 2 Drawing Sheets

(51) Int. Cl.
*G06F 17/00* (2006.01)
*G08G 1/16* (2006.01)
*B62D 15/02* (2006.01)
*B60Q 1/26* (2006.01)
*B60Q 9/00* (2006.01)
*B60K 35/00* (2006.01)

(52) U.S. Cl.
CPC ............... *B60Q9/006* (2013.01); *B60Q 9/007* (2013.01); *B60K 35/00* (2013.01); *B60K 2350/1084* (2013.01); *B60K 2350/2052* (2013.01); *G02B 27/01* (2013.01); *G02B 2027/0141* (2013.01)
USPC ........ 701/301; 340/904; 340/932.2; 340/988; 340/435; 340/436; 340/815.45; 340/384.1; 345/7

(56) References Cited

U.S. PATENT DOCUMENTS

| | | | |
|---|---|---|---|
| 6,683,539 B2 * | 1/2004 | Trajkovic et al. | 340/932.2 |
| 7,088,262 B2 * | 8/2006 | Schindler et al. | 340/932.2 |
| 7,375,621 B1 | 5/2008 | Hines | |
| 7,679,495 B2 * | 3/2010 | Beutnagel-Buchner et al. | 340/435 |
| 8,164,543 B2 * | 4/2012 | Seder et al. | 345/7 |
| 8,350,724 B2 * | 1/2013 | Szczerba et al. | 340/932.2 |
| 2004/0080404 A1 | 4/2004 | White | |
| 2008/0036878 A1 * | 2/2008 | Schmid et al. | 348/231.99 |
| 2009/0096937 A1 * | 4/2009 | Bauer et al. | 348/739 |
| 2009/0290369 A1 * | 11/2009 | Schofield et al. | 362/494 |
| 2010/0060486 A1 * | 3/2010 | Nakashima et al. | 340/932.2 |
| 2011/0202862 A1 * | 8/2011 | Kramer et al. | 715/771 |

FOREIGN PATENT DOCUMENTS

| | | |
|---|---|---|
| DE | 19741896 A1 | 4/1999 |
| DE | 10065230 A1 | 7/2002 |
| DE | 102007042966 A1 | 4/2009 |
| DE | 102008019461 A1 | 10/2009 |
| DE | 102009018680 A1 | 10/2010 |
| EP | 1396748 A2 | 3/2004 |

OTHER PUBLICATIONS

Acharya et al, System Design of Time-of-Flight Range Camera for Car Park Assist and Backup Application, IEEE Computer Society Conference on Computer Vision and Pattern Recognition Workshops, 2008, pp. 1-6.*
German Patent Office, German Search Report for Application No. 10 2011 121 285.3 dated Aug. 2, 2012.
Search Report issued in GB Application No. 1219390.0 dated Feb. 14, 2013.

* cited by examiner

PARKING ASSIST SYSTEM

CROSS-REFERENCE TO RELATED APPLICATION

This application claims priority to German Patent Application No. 10 2011 121 285.3, filed Dec. 15, 2011, which is incorporated herein by reference in its entirety.

TECHNICAL FIELD

The technical field relates to a device for assisting the driver of a vehicle, in particular a motor vehicle, in the process of parking. The device encompasses sensors for detecting obstacles in an environment of the vehicle, at least in the environment in front and in back of the vehicle, and a display for indicating the distance between the vehicle and an obstacle identified in the environment.

BACKGROUND

Such a device is known in prior art from publication DE 10 2007 042 966 A1. Described therein is a parking assist system for a motor vehicle, in which the current determined distance between the motor vehicle and an obstacle can be shown on the windshield of the vehicle by means of a head-up display.

However, the problem is that the distance from a rear obstacle is also displayed on the windshield in the device from publication DE 10 2007 042 966 A1, so that the vehicle moves in reverse while parking, even though the driver is looking in the opposite direction to scan the information from the head-up display on the windshield of the vehicle.

Therefore, it may be desirable to indicate an improved device for assisting the driver of a vehicle in the process of parking, with which the driver can also directly observe what is going on around the vehicle in terms of traffic. In addition, other objects, desirable features and characteristics will become apparent from the subsequent summary and detailed description, and the appended claims, taken in conjunction with the accompanying drawings and this background.

SUMMARY

According to various aspects of the present disclosure, provided is a device for assisting the driver of a vehicle in the process of parking, wherein the device has sensors for detecting obstacles in an environment of the vehicle, at least in an environment in front and in back of the vehicle, and a display for indicating the distance between the vehicle and an obstacle identified in the environment. The device according to the present disclosure is characterized in that the display encompasses a first means with which the distance between the vehicle and an obstacle identified in front of the vehicle can be displayed on/in a windshield of the vehicle, and a second means with which the distance between the vehicle and an obstacle identified in back of the vehicle can be displayed on/in a rear window of the vehicle.

The vehicle according to the present disclosure ensures that, while parking, the driver looks in the respective direction that the vehicle is currently moving in the process of parking, during which the distance from an obstacle detected by the sensors is displayed at a suitable location on/in the windshield or rear window. The driver directly recognizes and observes the relevant events transpiring around him, and also receives a visual image of the distance from the respective obstacle identified in the current traveling direction in the respective current viewing direction.

Let it be noted that the term "in front of the vehicle" or "in back of the vehicle" denotes the area located ahead of the front of the vehicle or behind the tail of the vehicle.

In one exemplary embodiment, the device according to the present disclosure is characterized in that the first means is designed and set up in such a way that an immovably positioned first symbol representing the vehicle and a second symbol representing the obstacle in front of the vehicle can be displayed on the windshield, wherein a position of the second symbol relative to the first symbol changes as a function of the distance between the vehicle and obstacle, and that the second means is designed and set up in such a way that an immovably positioned third symbol representing the vehicle and a fourth symbol representing an obstacle in back of the vehicle can be displayed, wherein a position of the fourth symbol relative to the third symbol changes as a function of the distance between the vehicle and obstacle.

The first and third symbols are substantially identical. They generally represent a schematic image of the vehicle itself, or of its contours. In the simplest case, the vehicle itself is shown as a line representing the front or tail of the vehicle. Of course, the first and third symbols can be selected from essentially any collection of symbol shapes desired, with preference being given to simple shapes, in particular to symbols that intuitively obviously represent the vehicle itself. Of course, the first and third symbols can also differ. The first symbol will generally only represent the front part of the vehicle itself, while the third symbol generally represents the tail part of the vehicle. As described previously, the first and third symbols are shown/displayed immovably positioned on the respective pane (windshield/rear window).

In like manner, the second and fourth symbols are substantially identical. They generally represent a line or contour of the respectively detected obstacle. Of course, the second and fourth symbols can be selected from essentially any collection of symbol shapes, with preference being given to simple shapes, in particular to symbols that intuitively obviously represent the obstacle. Of course, the second and fourth symbols can also differ, in particular in cases where a respective current contour of the respective obstacle can be displayed, and the obstacles in front and in back of the vehicle differ in terms of their contours.

The first means and second means are generally designed and set up in such a way that, as the vehicle approaches the respective obstacle, the second or fourth symbol moves closer to the immovably positioned first and third symbol shown on the respective panes (windshield/rear window) in a vertical or horizontal direction. This makes it possible to easily and intuitively interpret the distance represented and the change in distance relative to the respective obstacle. It goes without saying that, as the distance from a respective obstacle increases, the second/fourth symbol again moves away from the first/third symbol.

Another exemplary embodiment of the device according to the present disclosure is characterized in that the first means and second means are designed and set up in such a way that the first/third symbol and/or the second/fourth symbol change in (symbol) shape and/or color as a function of the distance from the respective obstacle. This makes it possible to code various cautionary areas or spaces relative to the respective obstacle, for example a normal maneuvering area (green), a cautionary area (yellow), and a danger area (red), which each require that the vehicle be driven with the appropriate care to avoid colliding with the respective obstacle.

In one exemplary embodiment, a scale and/or numerical distance value are additionally displayed on the respective pane, so that the driver can also scan the current distance from a respective obstacle graphically or as a numerical value.

Another exemplary embodiment of the device according to the present disclosure is characterized in that the first means and second means are optical projectors, in particular head-up displays, with which the respective symbols can be projected onto the windshield/rear window. Another exemplary embodiment of the device according to the present disclosure is characterized in that the first means encompasses light-emitting diodes integrated into the windshield, and the second means encompasses light emitting diodes integrated into the rear window, wherein the respective symbols can be displayed via the light-emitting diodes. These light-emitting diodes are generally designed in such a way as not to impede vision in any way, i.e., not be discernible to the human eye as foreign objects in the pane.

Another exemplary embodiment of the device according to the present disclosure is characterized in that acoustic signaling means are present, with which acoustic signals can be generated as a function of the distance from an identified obstacle. The acoustic signals can be individual tones (beeps), the transmission frequency of which increases as the distance from an obstacle decreases. In another exemplary embodiment, the acoustic signals are individual tones, the audio frequency of which becomes higher as the distance from an obstacle decreases.

Another exemplary embodiment of the device according to the present disclosure is characterized in that the first means and second means are designed and set up in such a way that the first means is only activated if the vehicle has been put into first gear, and the second means is only activated if the vehicle has been put into reverse. This ensures that the parking assist system will only be active when needed.

The various aspects of the present disclosure also provide a vehicle equipped with a device of the kind described above.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
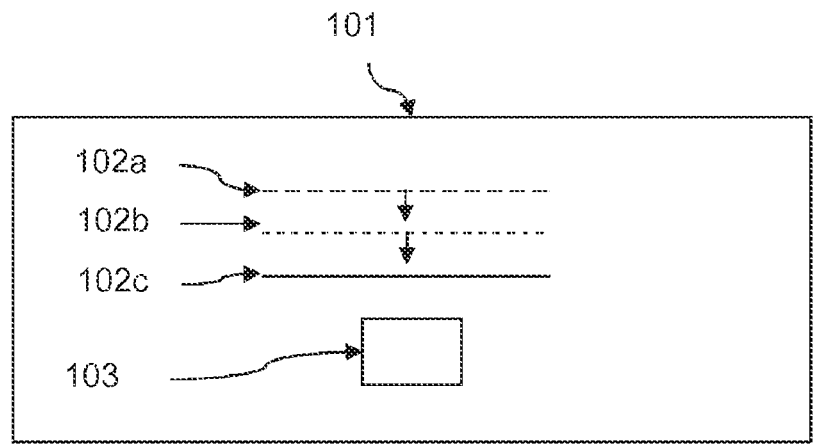
FIG. 1 is a schematized view of a distance displayed on the windshield of a vehicle according to an exemplary embodiment.

FIG. 1 shows a schematized view of a distance displayed on a windshield 202 of a vehicle 200 by means of a device according to the present disclosure for assisting a driver in the process of parking. The first means 201 is here designed and set up in such a way that an immovably positioned rectangular symbol 103 representing the vehicle 200 and a linear symbol representing the obstacle 208a in front of the vehicle 200 are displayed on the windshield 202. While the displayed position of the rectangular symbol 103 does not change as the vehicle approaches the obstacle 208a, the linear symbol 102a moves closer to the rectangular symbol 103 vertically from above as the distance from the obstacle 208a decreases. As the linear symbol 102a approaches the rectangular symbol 103, the type and color of the line also changes. FIG. 1 depicts the linear symbol 102a, 102b and 102c for a respectively corresponding three distances between the vehicle and obstacle 208a. The first means 201 is here designed as an optical projector that displays the symbols 102a-c and 103 in the windshield. The windshield 202 is designed as known from prior art for this purpose.

Figure 2:
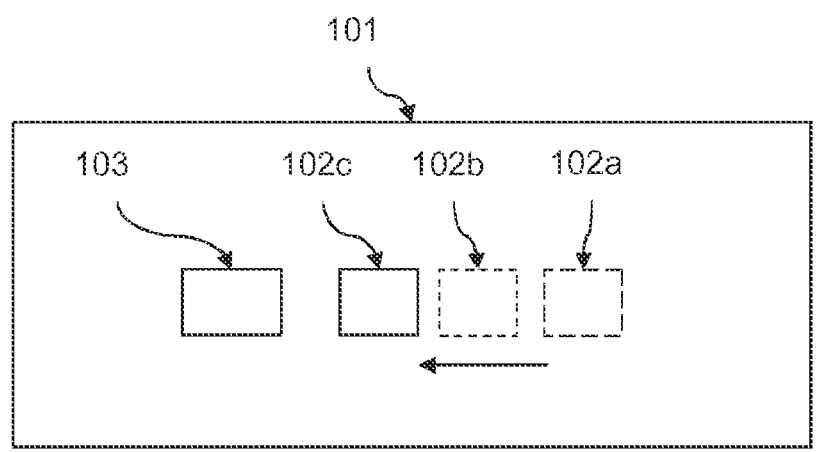
FIG. 2 is a schematized view of a distance displayed on the rear window of a vehicle according to another exemplary embodiment.

FIG. 2 shows a schematized view of a distance displayed on a rear window 204 of the vehicle 200 by means of a device according to the present disclosure for assisting a driver in the process of parking. The second means 203 is here designed and set up in such a way that an immovably positioned rectangular symbol 103 representing the vehicle 200 and a rectangular symbol (102a-c) representing the obstacle 208b in back of the vehicle 200 are displayed on the rear window 204. While the displayed position of the rectangular symbol 103 does not change as the vehicle approaches the obstacle 208b, the rectangular symbol 102a moves closer to the rectangular symbol 103 horizontally from the right as the distance from the obstacle 208a decreases. As the rectangular symbol 102a approaches the rectangular symbol 103, the type and color of the line also changes. FIG. 2 depicts the rectangular symbol 102a, 102b and 102c for a respectively corresponding three distances between the vehicle and obstacle 208b. The second means 203 is here designed as an optical projector that displays the symbols 102a-c and 103 in the rear window. The rear window 204 is designed as known from prior art for this purpose.

Figure 3:
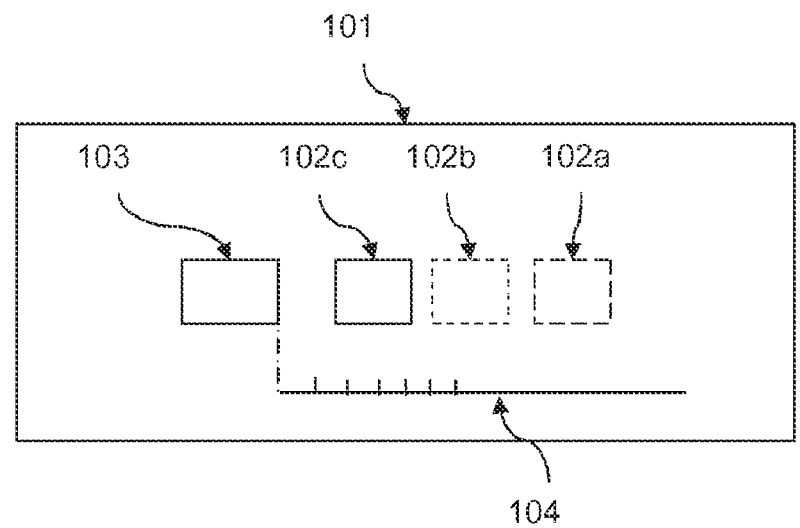
FIG. 3 is a schematized view of a distance displayed on the rear window of a vehicle according to another exemplary embodiment.

FIG. 3 differs from FIG. 2 only in that a map scale bar is additionally projected in the rear window 204, so that the driver can scan the distance from the obstacle 208b, for example in centimeters. The current distance value is generally also displayed numerically.

Figure 4:
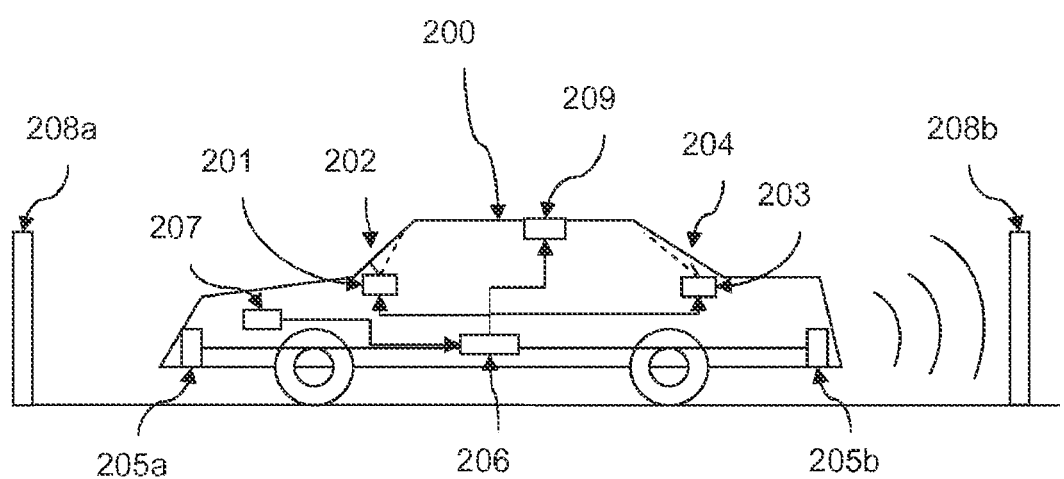
FIG. 4 is a schematized view of a device according to the present disclosure integrated into a vehicle.

FIG. 4 shows a schematized view of a device according to the present disclosure integrated into a vehicle 200. The device encompasses sensors 205a, 205b for detecting obstacles 208a, 208b in an environment in front and in back of the vehicle 200, and a display means for displaying a distance between the vehicle 200 and an obstacle 208a, 208b identified in the environment. The display means further encompasses a first means 201, with which the distance between the vehicle 200 and an obstacle 208a identified in front of the vehicle 200 can be displayed on a windshield 202 of the vehicle 200, and a second means 203, with which the distance between the vehicle 200 and an obstacle 208b identified in back of the vehicle 200 can be displayed on a rear window 204 of the vehicle 200. The first and second means are here each designed as head-up displays, i.e., as optical projectors. The device also encompasses a controller 206 which, as evident from the connecting lines, is connected with the first means 210, the second means 203, the sensors 205a, 205b, a transmission sensor 207 that determines the currently engaged gear, and an acoustic signaling means 209, with which acoustic signals can be generated as a function of the distance from an identified obstacle 208b. The first means 201 and second means 203 are here designed and set up in such a way that the first means 201 is only activated if the vehicle 200 has been put into first gear, and the second means 203 is only activated if the vehicle 200 has been put into reverse. These states are detected by the transmission sensor 207. The controller 206 controls the display of the first means 201 and second means 203 as a function of the distance data acquired by the sensors 205a, 205b, and as a function of the state relative to the currently engaged gear detected by the transmission sensor, so that an immovably positioned first symbol 103 representing the vehicle 200 and a second symbol 102a-c representing the obstacle 208a in front of the vehicle 200 can be displayed on the windshield 202, wherein a position of the second symbol 102a-c relative to the first symbol 103 changes as a function of the distance between the vehicle 200 and obstacle 208a, and so that an immovably positioned third symbol 103 representing the vehicle 200 and a fourth symbol 102a-c representing the obstacle 208b in back of the vehicle 200 can be displayed on the rear window 204, wherein a position of the fourth symbol 102a-c relative to the third symbol 103 changes as a function of the distance between the vehicle 200 and obstacle 208b.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A device for assisting the driver of a vehicle in the process of parking, comprising:
   a plurality of sensors for detecting obstacles in an environment of the vehicle, at least in an environment in front and in back of the vehicle;
   a display for indicating the distance between the vehicle and an obstacle identified in the environment, the display including:
      a first means, with which the distance between the vehicle and a first obstacle identified in front of the vehicle is displayable as a line on a windshield of the vehicle, wherein the vehicle is displayable as an immovably positioned first rectangular symbol below the line of the windshield, and wherein the line moves closer to the first rectangular symbol as a distance from the first obstacle decreases; and
      a second means, with which the distance between the vehicle and a second obstacle identified in back of the vehicle is displayable as a second rectangular symbol on a rear window of the vehicle, wherein the vehicle is displayable as an immovably positioned third rectangular symbol, and wherein the second rectangular symbol moves closer to the third rectangular symbol as a distance from the vehicle to the second obstacle decreases.

2. The device according to claim 1, wherein the first means and second means are optical projectors, with which the respective symbols are projected onto the respective one of the windshield and rear window.

3. The device according to claim 2, wherein the first means and second means are head-up displays.

4. The device according to claim 1, wherein the first means further comprises light-emitting diodes integrated into the windshield, the second means further comprises light emitting diodes integrated into the rear window, and the respective symbols are displayed via the light-emitting diodes.

5. The device according to claim 1, wherein the first means and second means are designed and set up in such a way that at least one of the first rectangular symbol, the second rectangular symbol, the third rectangular symbol and the line change in at least one of shape and color as a function of the distance from the respective obstacle.

6. The device according to claim 1, wherein an acoustic signaling means is present, with which acoustic signals are generated as a function of the distance from an identified obstacle.

7. The device according to claim 1, wherein the first means and second means are designed and set up in such a way that the first means is only activated if the vehicle has been put into first gear, and the second means is only activated if the vehicle has been put into reverse.

8. A vehicle, comprising:
   a plurality of sensors for detecting obstacles in an environment of the vehicle, at least in an environment in front and in back of the vehicle;
   a display for indicating the distance between the vehicle and an obstacle identified in the environment, the display including:
      a first optical projector, with which the distance between the vehicle and a first obstacle identified in front of the vehicle is displayable as a line on a windshield of the vehicle, wherein the vehicle is displayable as a first rectangular symbol below the line on the windshield, and wherein the line moves closer to the first rectangular symbol as a distance from the first obstacle decreases; and
      a second optical projector, with which the distance between the vehicle and a second obstacle identified in back of the vehicle is displayable as a second rectangular symbol on a rear window of the vehicle, wherein the vehicle is displayable as an immovably positioned third rectangular symbol, and wherein the second rectangular symbol is moves closer to the third rectangular symbol as a distance from the vehicle to the second obstacle decreases.

9. The vehicle according to claim 8, wherein the first optical projector and the second optical projector are designed and set up in such a way that at least one of the first rectangular symbol, the second rectangular symbol, the third rectangular symbol, and the line change in at least one of shape and color as a function of the distance from the respective obstacle.

10. The vehicle according to claim 8, wherein an acoustic signaling means is present, with which acoustic signals are generated as a function of the distance from an identified obstacle.

11. The vehicle according to claim 8, wherein the first optical projector and the second optical projector are designed and set up in such a way that the first optical projector is only activated if the vehicle has been put into first gear, and the second optical projector is only activated if the vehicle has been put into reverse.

* * * * *